(12) United States Patent
Van Luchene

(10) Patent No.: US 7,350,304 B2
(45) Date of Patent: Apr. 1, 2008

(54) AUTOMATED LEVELING APPARATUS

(75) Inventor: Andrew Stephen Van Luchene, Santa Fe, NM (US)

(73) Assignee: Leviathan Entertainment

( * ) Notice: Subject to any disclaimer, the term of this patent is extended or adjusted under 35 U.S.C. 154(b) by 127 days.

(21) Appl. No.: 11/384,650

(22) Filed: Mar. 20, 2006

(65) Prior Publication Data
US 2007/0214668 A1    Sep. 20, 2007

(51) Int. Cl.
*G01C 9/06* (2006.01)
(52) U.S. Cl. .................................................. 33/366.11
(58) Field of Classification Search ............. 33/366.11, 33/366.19, 366.25
See application file for complete search history.

(56) References Cited
U.S. PATENT DOCUMENTS
6,800,841 B1 * 10/2004 Chou ...................... 33/366.11
6,987,460 B2 * 1/2006 Tews et al. ................. 340/689

* cited by examiner

*Primary Examiner*—Yaritza Guadalupe-McCall
(74) *Attorney, Agent, or Firm*—Gonzales Patent Services; Ellen Gonzales

(57) ABSTRACT

Various embodiments of the present invention provide an inexpensive and easy to use apparatus and method that permits a user to attach an apparatus to existing picture frames or other objects with various advantages. Such embodiments will keep a picture, object or frame in a substantially continuously level position or otherwise aligned position. Thus, using the disclosed apparatus, a user can ensure that any picture, frame or other hanging and relatively flat object will generally remain in a pleasantly horizontal or other desired aspect, without need for ongoing user inspection or manual adjustment.

3 Claims, 5 Drawing Sheets

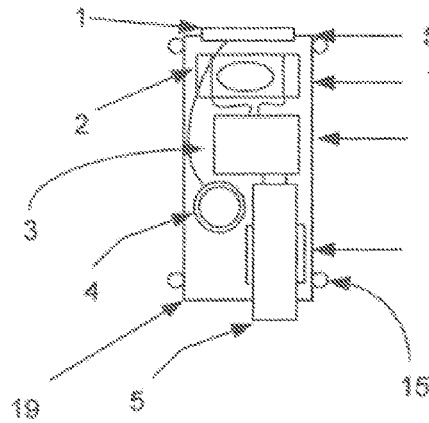
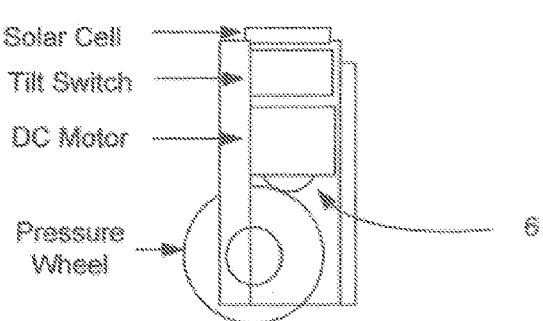
Picture Leveler Wheel Model
Fig. 1A
Picture Leveler Wheel Model
Fig. 1B
Solar Cell
Tilt Switch
DC Motor
Pressure Wheel
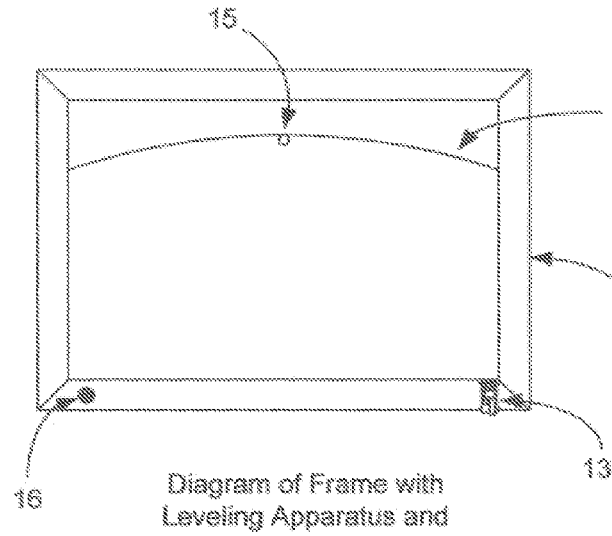
Diagram of Frame with Leveling Apparatus and Glide Attached
Fig. 1C
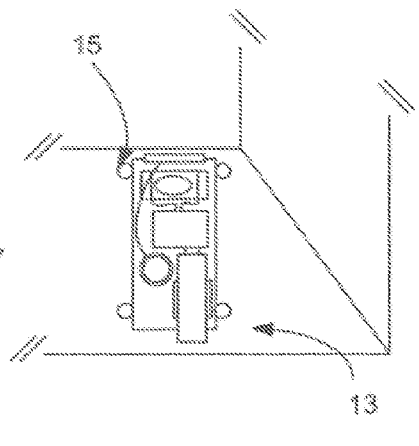
Closeup Diagram of Frame with Leveling Apparatus Attached
Fig. 1D Picture Leveler
Surface Pressure Model Picture Leveler
Surface Pressure Model Picture Leveler
Surface Pressure Model Picture Leveler
Surface Pressure Model Circuit #1
Dual Throw, Dual Pole
Tilt Switch Circuit #2
Two Dual Throw, Single Pole
Tilt Switches Solar Charger Diagram Side View
Dual Pole, Dual Throw Tilt Switch

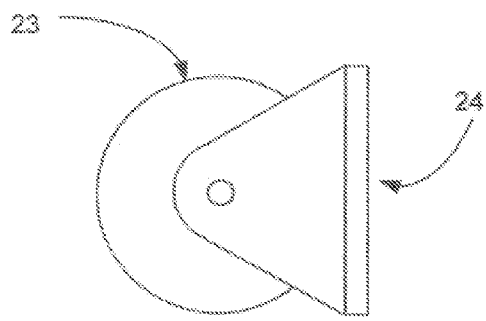
Close Up
Side View
Glide Wheel
Fig. 5A
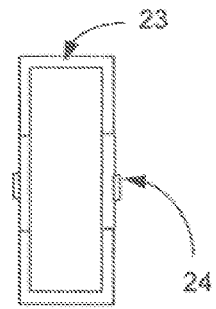
Close Up
Frontal View Perspective
Glide Wheel
Fig. 5B
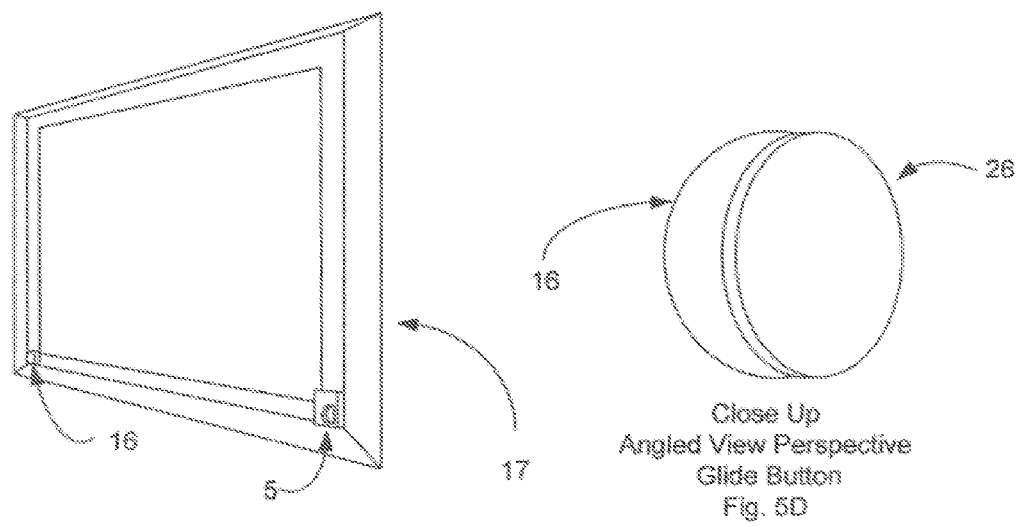
Close Up
Angled View Perspective
Glide Wheel
Fig. 5C
Close Up
Angled View Perspective
Glide Button
Fig. 5D

AUTOMATED LEVELING APPARATUS

BACKGROUND

When hanging items on a wall or other surface, it is well known that such items can become undesirably misaligned. Such misalignment can detract from the pleasure of viewing the item. Currently, a viewer is required to move the misaligned item manually. Without the use a level, a viewer may have to approach the item, realign it, and then move a distance away from the item to determine whether the item has been moved back to the desired orientation. The viewer may have to repeat this process numerous times in order to accurately move the item to the desired orientation. Moreover, such manual alignment can often spark controversy or disagreement between multiple viewers over whether the item has, in fact, been returned to proper alignment. Improved methods for aligning items hung on a wall or surface are, therefore, desirable.

BRIEF DESCRIPTION OF THE DRAWINGS

FIG. 1A is a backside perspective view of an embodiment of the present invention.

FIG. 1B is a side perspective view of the embodiment shown in FIG. 1A.

FIG. 1C is a backside perspective view of a Frame with a Leveling Apparatus and Glide Button attached.

FIG. 1D is an enlarged and close-up view of the lower right hand corner of FIG. 1C.

FIG. 5A is a side view perspective of a Glide Wheel.

FIG. 5B is a frontal view perspective of a Glide Wheel.

FIG. 5C is an angled view perspective of a Glide Button and a Leveling Apparatus attached to a Frame.

FIG. 5D is an angled perspective view of a Glide Button.

DETAILED DESCRIPTION

Figure 2A:
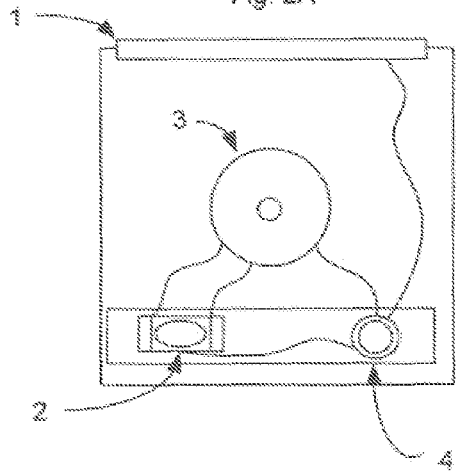
FIG. 2A is a front perspective view of an alternative embodiment of the present invention.

Various embodiments of the invention relate to an apparatus that may be attached to, and which automatically adjusts and levels, hanging pictures, other square, rectangle or other shaped objects i.e., Frames or Works, and methods for their use.

Various embodiments of the present invention provide an inexpensive, and easy to use apparatus and method that permits a User to attach an apparatus to existing Frames with various advantages. Such embodiments will keep a picture or other object or Frame in a substantially continuously level position or otherwise Aligned position. Thus, a User can ensure that any Frame or other hanging and relatively flat object will generally remain in a pleasantly horizontal or other desired aspect, without need for ongoing User inspection or manual adjustment.

In some circumstances, various embodiments of the present invention may be adapted for use in conjunction with many known devices and, therefore is an improvement upon, several of the previously known inventions.

Various embodiments of the present invention address the need to provide a leveling device for existing or traditional Frames or other objects, and the need to provide for any ongoing automatic adjustments.

Various embodiments of the present invention address the problem of a picture hung "out of level" and corrects such pictures if there is user error upon initial installation or subsequent manual adjustment of the device(s) or frames.

Various embodiments of the present invention may be readily employed with the millions of existing, popular and widely used picture frames and other Frames that are hung using the well known and widely adopted "hook and wire" hardware as depicted in FIG. 1C showing a Hook 15 and wire 14.

Various embodiments of the present invention work effectively with existing picture frames and other hanging objects, without the need for major modifications to the frames or objects, nor changes to widely accepted practices, nor any particular skills or craftsmanship by the User.

Various embodiments of the present invention permit a Frame that is nudged or that is otherwise not properly Aligned to be automatically returned to its Aligned position.

An embodiment of the present invention includes an apparatus for automatically adjusting and leveling hanging pictures or other Frames or objects, and methods for use of such an apparatus. In an embodiment, the device comprises seven main components including a (an):

1. Enclosure
2. Dual Throw, Dual Pole Tilt Switch (or other device(s) for determining misalignment)
3. Direct Current (DC) Motor (or other power source or motor type)
4. Battery (or other power source)
5. A Wheel attached to the Motor via a Gear
6. Wiring connecting the Tilt Switch, Battery, Motor and, if included, Solar Charger.
7. Solar Charger (or other means for recharging a battery or other power source)

It is readily apparent to one of ordinary skill in the art that various substitutions may be made to the specific components listed immediately above.

When mounted to the lower right corner (or, e.g., the lower left corner with minor and apparent modifications) of a Frame or other object, the apparatus is activated whenever the Frame or object becomes misaligned. When either corner is lowered, the integral Tilt Switch "senses" this misalignment and an electrical circuit is created or closed. This electrical circuit, in turn, supplies power (in the form of an electrical current) to a DC motor, which causes the DC motor to turn, which then turns a Gear that is further attached to a Wheel. This Wheel is positioned in the apparatus such that, when attached to the Frame, the Wheel will come in direct contact with the adjacent wall or other stationary mounting object. When the Wheel turns, the Frame is moved, e.g., up or down, at the corner where the device is attached, thereby realigning the Frame or object.

For example, in the event that the lower right corner of the Frame (or object) is too low, a Motor turns a Wheel in a clockwise direction (when viewing the device from the right side of the Frame), which pushes the lower right corner of the Frame (or object) up the wall (or along whatever the Frame or object may be attached).

In the event that the lower right corner of the Frame is too high, the Tilt Switch is engaged such that the polarity of the current is reversed, causing the motor to turn in a counter-clockwise direction (when viewing the device from the right side of the frame), which causes the right corner to move lower in relation to the wall.

In either case, as the Fame (or object or Work) returns to proper alignment, e.g., level with the floor (or Earth), the Tilt Switch is returned to the "null" position, which opens the previously established circuit. Without power, the motor ceases to turn, causing the wheel to stop. In this fashion, the Frame remains in a consistently Aligned position. Furthermore, battery or other electrical power is conserved as such power is generally consumed when the Frame is misaligned.

An embodiment of the present invention includes a buzzer or other device capable of generating a sound, which may alert the User that the apparatus is functioning.

An embodiment of the present invention includes a Light Emitting Diode (LED) or other device capable of generating visible light, which may alert the User that the apparatus is functioning.

Various other embodiments are described.

Definitions

Terms a. Aligned—shall mean aligned in a desired manner, such as substantially level with the earth. In an embodiment, aligned means that a portion of the object that is desired to be aligned (e.g., a portion such as a bottom horizontal edge) lies substantially in the plane that is normal (perpendicular) to the axis defined by the direction of gravity. This plane is referred to as the "horizontal plane". In such an embodiment, the portion of the object (e.g., the bottom edge) would be substantially perpendicular to the axis defined by the direction of gravity, and where the portion defines an axis, such an axis lies substantially in the horizontal plane (but may form a small angle with respect to the horizontal plane). Thus, 'aligned' can mean aligned within a threshold number of degrees (e.g., within 5 degrees) of a plane (e.g., the horizontal plane). In other embodiments, an object or portion of the object is aligned with respect to a plane that is not coincident with the horizontal plane. For example, it may be desirable to align an object or portion of an object b. User—shall mean any person including a person making use or practicing the various disclosed embodiments of the invention.

c. Frame—shall mean a structure or framework supporting or containing something or in which a picture is mounted, or any other fixtures, such as a mirror, commercial signage or other similar objects that may be hung, e.g., on a wall or other base.

d. Work—shall mean an object, including but not limited to, a picture, painting, mirror or poster that is contained within a Frame or other border materials.

e. Tilt Switch—shall mean a device (whether or not commercially available or custom manufactured) that is capable of detecting a change in orientation on a single axis or on multiple axes. A Tilt Switch may include, but is not limited to any one (or more, as necessary or desired) of the following devices: a Single-Pole, Double-Throw (SPDT) mercury tilt switch, pendulum inclinator or tilt switch, "ball in tube" tilt switch or any solid state, liquid filled, electrolytic inclinometer/tilt sensor, or any other suitable tilt sensing device.

f. Motor—shall mean a (commercially available or custom manufactured) Direct Current (DC) Motor or any other suitable device(s) that convert electrical current into mechanical or physical motion.

g. Solar Charger—shall mean a device (whether such device is commercially available or custom manufactured) that is capable of converting sunlight, ambient light, or other light (whether or not considered "visible light") or other electromagnetic radiation into an electrical current using one or more transducers (e.g., photovoltaic cells) and may include a regulation device to prevent overcharging.

h. The term "product" means any machine, manufacture and/or composition of matter, unless expressly specified otherwise.

i. The term "process" means any process, algorithm, method or the like, unless expressly specified otherwise.

j. Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

k. The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

l. The term "variation" of an invention means an embodiment of the invention, unless expressly specified otherwise.

m. A reference to "another embodiment" in describing an embodiment does not imply that the referenced embodiment is mutually exclusive with another embodiment (e.g., an embodiment described before the referenced embodiment), unless expressly specified otherwise.

n. The terms "including", "comprising" and variations thereof mean "including but not limited to", unless expressly specified otherwise.

o. The term "consisting of" and variations thereof mean "including and limited to", unless expressly specified otherwise.

p. The terms "a", "an" and "the" mean "one or more", unless expressly specified otherwise.

q. The term "plurality" means "two or more", unless expressly specified otherwise.

r. The term "herein" means "in this patent application, including anything which may be incorporated by reference", unless expressly specified otherwise.

s. The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

t. Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.
u. The phrase "based on" does not mean "based only on", unless expressly specified otherwise. In other words, the phrase "based on" describes both "based only on" and "based at least on".
v. The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".
w. The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.
x. The term "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".
y. The term "i.e." and like terms means "that is", and thus limits the term or phrase it explains. For example, in the sentence "the computer sends data (i.e., instructions) over the Internet", the term "i.e." explains that "instructions" are the "data" that the computer sends over the Internet.

Determining/Sensing a. The terms "determine", "sense", "determining", or "sensing" and grammatical variants thereof (e.g., to determine a price, determining a value, sensing an angle, determine an object which meets a certain criterion) is used in an extremely broad sense. The terms "determine" "sense" "determining" or "sensing" encompasses a wide variety of actions and therefore can include calculating, computing, processing, examining, deriving, investigating, looking up (e.g., looking up in a table, a database or another data structure), ascertaining and the like. Also, "determine", "sense", "determining", or "sensing" can include receiving (e.g., receiving information), accessing (e.g., accessing data in a memory), the closing an electrical circuit" and the like and can also include resolving, selecting, choosing, establishing, and the like.
b. The terms "determine", "sense", "determining", or "sensing" does not imply certainty or absolute precision, and therefore can include estimating, predicting, guessing and the like.
c. The terms "determine", "sense", "determining", or "sensing" does not imply that mathematical processing must be performed, and does not imply that numerical methods must be used, and does not imply that an algorithm or process is used.
d. The terms "determine", "sense", "determining", or "sensing" does not imply that any particular device must be used. For example, a computer need not necessarily perform the determining or sensing.

Forms of Sentences a. Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).
b. Each claim in a set of claims has a different scope. Therefore, for example, where a limitation is explicitly recited in a dependent claim, but not explicitly recited in any claim from which the dependent claim depends (directly or indirectly), that limitation is not to be read into any claim from which the dependent claim depends.
c. When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.
d. When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).
e. Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

f. The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Disclosed Examples and Terminology Are Not Limiting a. Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical or electro-mechanical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

b. The present disclosure is neither a literal description of all embodiments of the invention nor a listing of features of the invention which must be present in all embodiments.

c. Neither the Title (set forth at the beginning of the first page of this patent application) nor the Abstract (set forth at the end of this patent application) is to be taken as limiting in any way as the scope of the disclosed invention(s). An Abstract has been included in this application merely because an Abstract of not more than 150 words is required under 37 C.F.R. § 1.72(b).

d. The title of this patent application and headings of sections provided in this patent application are for convenience only, and are not to be taken as limiting the disclosure in any way.

e. Devices that are described as in communication or otherwise connected with each other need not be in continuous communication or connection with each other, unless expressly specified otherwise. On the contrary, such devices need only transmit or be otherwise connected to each other as necessary or desirable, and may actually refrain from exchanging data or electrical current most of the time. For example, a machine in communication with another machine via the Internet may not transmit data to the other machine for a prolonged period (e.g. weeks at a time). In addition, devices that are in communication with each other may communicate directly or indirectly through one or more intermediaries.

f. A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

g. Although process steps, algorithms or the like may be described in a sequential order, such processes may be configured to work in different orders. In other words, any sequence or order of steps that may be explicitly described does not necessarily indicate a requirement that the steps be performed in that order. On the contrary, the steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

h. Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

i. Although a product may be described as including a plurality of components, aspects, qualities, characteristics and/or features, that does not indicate that all of the plurality are essential or required. Various other embodiments within the scope of the described invention(s) include other products that omit some or all of the described plurality.

j. Unless expressly specified otherwise, an enumerated list of items (which may or may not be numbered) does not imply that any or all of the items are mutually exclusive. Therefore it is possible, but not necessarily true, that something can be considered to be, or fit the definition of, two or more of the items in an enumerated list. Also, an item in the enumerated list can be a subset (a specific type of) of another item in the enumerated list. For example, the enumerated list "a computer, a laptop, a PDA" does not imply that any or all of the three items of that list are mutually exclusive—e.g., an item can be both a laptop and a computer, and a "laptop" can be a subset of (a specific type of) a "computer".

k. Likewise, unless expressly specified otherwise, an enumerated list of items (which may or may not be numbered) does not imply that any or all of the items are collectively exhaustive or otherwise comprehensive of any category. For example, the enumerated list "a computer, a laptop, a PDA" does not imply that any or all of the three items of that list are comprehensive of any category.

l. Further, an enumerated listing of items does not imply that the items are ordered in any manner according to the order in which they are enumerated.

Computing a. It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

b. A "processor" means one or more microprocessors, central processing units (CPUs), computing devices, microcontrollers, digital signal processors, or like devices or any combination thereof.
c. Thus a description of a process is likewise a description of an apparatus for performing the process. The apparatus can include, e.g., a processor and those input devices and output devices that are appropriate to perform the method.
d. Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software or hardware only.
e. The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.
f. Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.
g. Thus a description of a process is likewise a description of a computer-readable medium storing a program for performing the process. The computer-readable medium can store (in any appropriate format) those program elements which are appropriate to perform the method.
h. Just as the description of various steps in a process does not indicate that all the described steps are required, embodiments of an apparatus include a computer/computing device operable to perform some (but not necessarily all) of the described process.
i. Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.
j. Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) are well known and could be used to store and manipulate the data types described herein. Likewise, object methods or behaviors of a database can be used to implement various processes, such as the described herein. In addition, the databases may, in a known manner, be stored locally or remotely from any device(s) which access data in the database.
k. Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.
l. In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Continuing Applications a. The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application. Applicants intend to file additional applications to pursue patents for subject matter that has been disclosed and enabled but not claimed in this patent application.

35 U.S.C. § 112, paragraph 6 a. In a claim, a limitation of the claim which includes the phrase "means for" or the phrase "step for" means that 35 U.S.C. § 112, paragraph 6, applies to that limitation.
b. In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).
c. With respect to a means or a step for performing a specified function in accordance with 35 U.S.C. § 112, paragraph 6, the corresponding structure, material or acts described in the specification, and equivalents thereof, may perform additional functions as well as the specified function.
d. Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.
e. Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Disclaimer a. Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature.

Description of Various Embodiments

While the invention is susceptible to various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, substituted materials, devices or electrical components, wiring, and the like including any and all equivalents falling within the spirit and scope of the claims.

Referring concurrently to FIGS. 1 and 3 of the drawings, details are provided for an apparatus, which, as designed, is responsive to changes in angle of the Frame 17, so as to prevent the Frame 17 from remaining in a misaligned state. Tilt Switches 2, also known as inclinometers, are well known and widely used, and are appropriate for use in various embodiments of the present invention and are commercially available in a variety of styles and types, with and without the use of mercury, other liquid electrolyte or other conductors. Therefore, only a brief description of generic tilt switches will be provided below. By way of example, one suitable tilt switch to be used herein is a mercury tilt switch that is manufactured by RXR Electronics of Avenel, N.J. as Part No. 1700TLMC. Another alternative would be use of a single or dual tilt sensors manufactured by Signal Quest of Lebanon NH, as Part No. SQ-SEN-001P/001PS. Various alternative part selections and implementations are readily apparent to anyone skilled in the art. However, a new Dual-Pole, Double-Throw (DPDT) Tilt Switch is disclosed herein and is ideally suited for use with various embodiments.

Alternatively, single or dual, solid-state single or dual axis inclinometers could be used such as those manufactured by Spectron of Hauppauge, N.Y. as Part No. TAD II. This option provides for a threshold, which may be adjusted by the user, and this threshold may determine the target angle, which is deemed the horizontal, or other desired angle of alignment.

Other types of inclinometers, and other devices, which determine an inclination with respect to the horizontal (i.e. the plane that is normal to the axis defined by the direction of gravity or other angle of desired alignment) exist and are well known to those skilled in the art.

In an embodiment, a dual throw, dual pole switch such as that described above and further defined below and in Diagram 4.b would be employed as a component of the disclosed apparatus.

The Motor 3 and Tilt switch 2 shown in FIGS. 1A-1D is enclosed by an outer protective casing 19. A mounting bracket with screw holes 27 is affixed to the casing 19 to enable the Leveling Apparatus to be attached to the rear of the picture Frame 17 or other object to be aligned.

In another embodiment, Casing 19 may include dual-sided adhesive tape 25 (FIG. 1B) instead of a mounting bracket and screw holes 27, which may be used to secure the apparatus to the Frame 17 without penetrating the Frame 17, or permanently or otherwise marring and/or damaging the Frame 17.

Figure 3A:
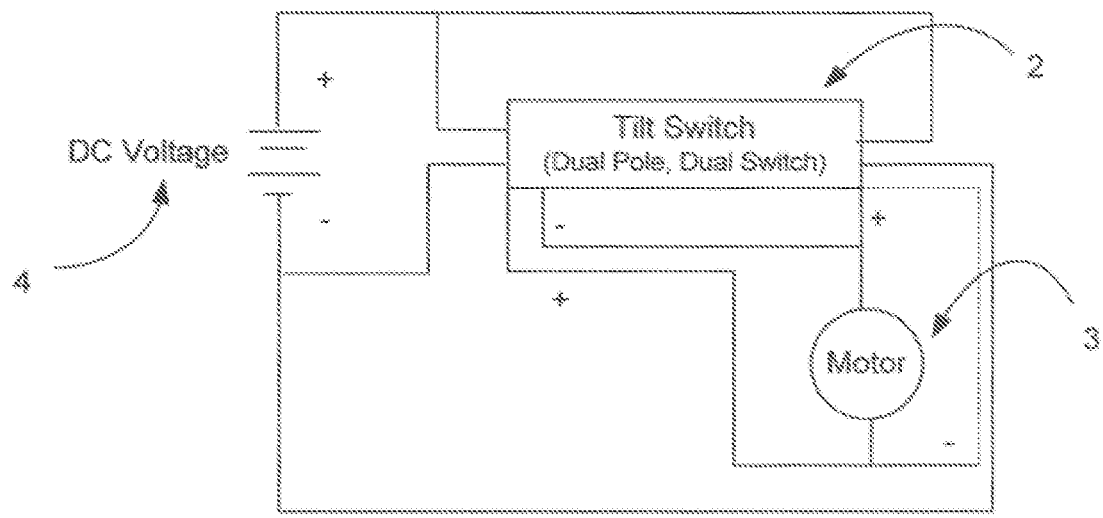
FIG. 3A is a wiring diagram of an embodiment of the present invention using a single, dual pole, dual throw tilt switch (DPDT).
Figure 3B:
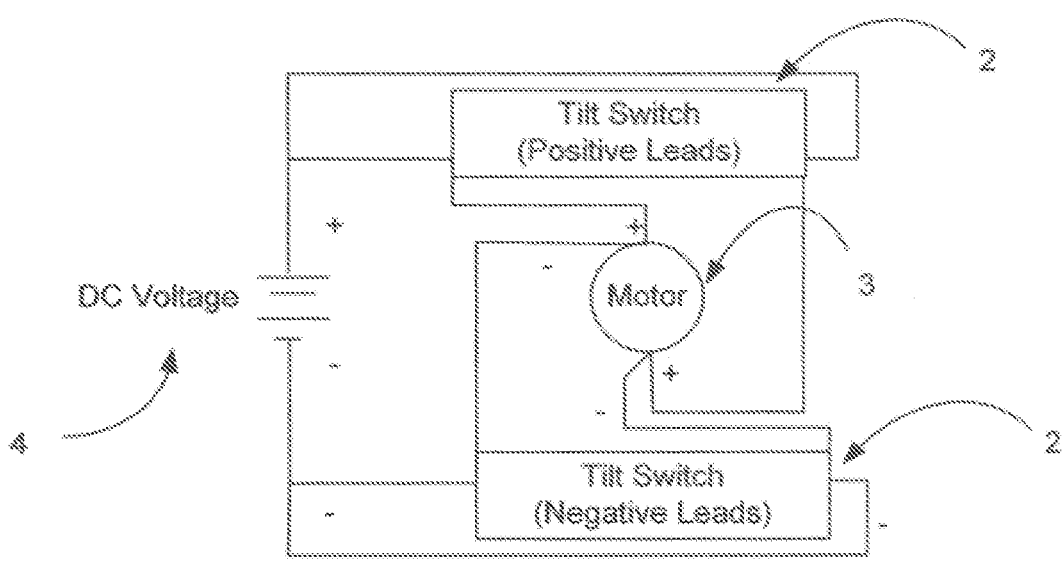
FIG. 3B is a wiring diagram of an alternative embodiment using two, single pole, dual throw tilt switches (SPDT).
Figure 4A:
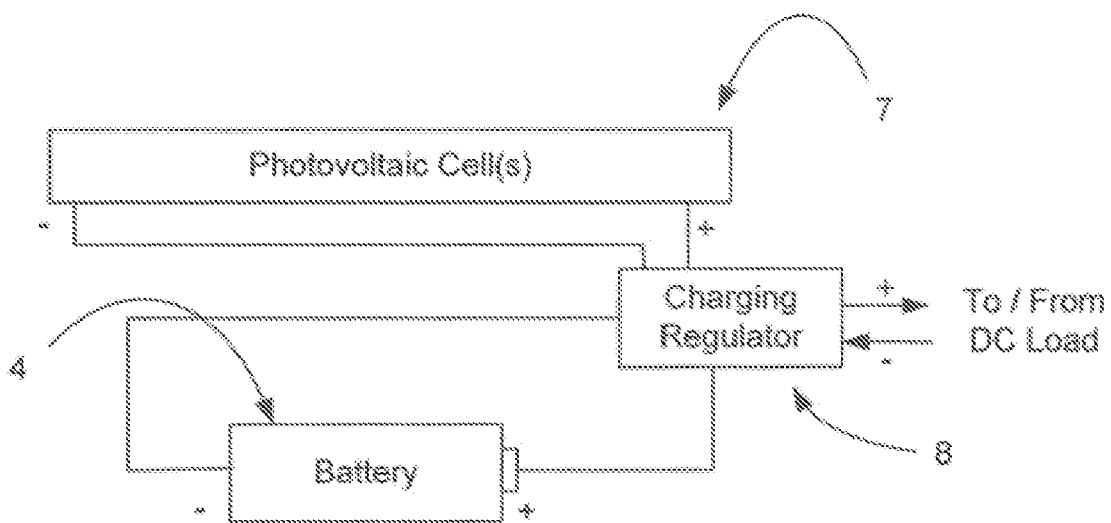
FIG. 4A is a wiring diagram for an optional Solar Charger with a regulation device.
Figure 4B:
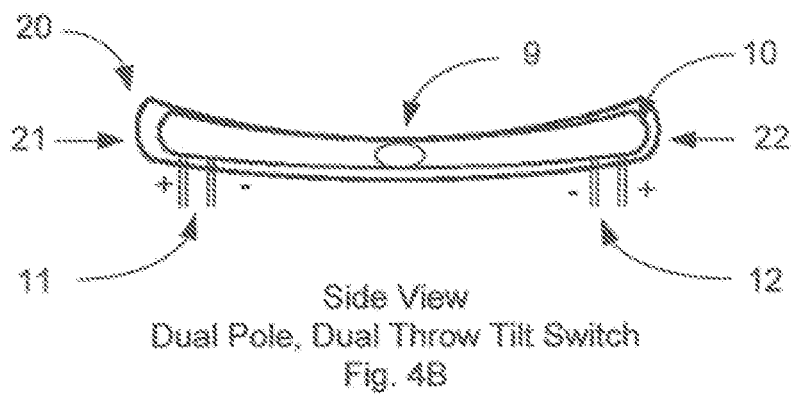
FIG. 4B is a diagram of a dual pole, dual throw (DPDT) mercury switch.

As shown in the embodiment depicted in FIG. 4B, the control Tilt Switch includes a hollow glass vial 10 that is suspended at the interior of the outer casing 20. The vial is shown having left and right chambers 21 and 22 that are angled slightly upward relative to the center section of the vial. A supply of mercury 9 or any other suitable electrically conductive liquid (or other conductor such as, e.g., a electrically conductive metal ball) is carried within the hollow vial 10. First ends of a dual pair of electrical switch contacts 11 and 12 are separated from one another at the interior of the vial 10 at either end 21 and 22 of the chamber 20 thereof. The opposite ends of switch contacts 11 and 12 are connected to respective electrical wires as more fully described in FIGS. 3A and 3B. The electrical wires 11 and 12 complete the aforementioned control circuit so that the Tilt Switch 2 and the Motor 3 may be connected in an electrical series with one another to control the operation of the Motor 3 in a manner that will be disclosed further below and as depicted in the wiring diagrams in FIGS. 3A and 3B.

By connecting a Tilt Switch(es) 2, Motor 3, Battery 4, Pressure Wheel 5, Gear 6, with wiring according to FIG. 3A or, FIG. 3B (as appropriate, or with other wiring assemblies that would be readily apparent to anyone skilled in the art) the resulting apparatus can be attached to, e.g., the bottom right edge of any picture, Frame, Work or object. Once in place, with a charged battery or other power source installed or attached, the apparatus will automatically adjust a Frame 17, e.g., up or down until the Frame is realigned as desired. Note that Wheel 5 may or may not include materials to aid in generating traction or friction. For example, Wheel 5 may be constructed of semi-pliable or hard plastic or rubber or it may have a rubber coating or layer, or groves or treads to aid in generating friction. Other coatings on the Wheel may be employed to generate appropriate amounts of friction with the applicable surfaces, and/or the Wheel 5 may be composed of other materials to generate appropriate amounts of friction with the applicable surfaces.

Upon closer inspection of FIGS. 3A and 3B, anyone skilled in the art will notice that both Motor 3 electrical contacts are connected to both positive and negative wiring posts, which is ultimately attached to Battery 4. With proper installation of the Tilt Switch(es) 2, it will be readily apparent that only a single circuit can be engaged (or closed) at any given moment depending upon the angle of inclination of the Tilt Switch(es). This novel arrangement provides a reversal of polarity, which permits the apparatus to deliver selective motion or movement, e.g., to deliver up or down movement of the Frame 17 in a manner which achieves alignment.

FIG. 3A assumes the use of a novel Dual Pole, Dual Throw Tilt Switch as further disclosed herein; however, an alternative method is disclosed using two Single-Pole, Double-Throw (SPDT) Tilt Switches as seen in FIG. 3B. In either depicted case, the depicted wiring ensures that only one circuit with a given polarity is closed at any given time, thus protecting the Motor 3 from any electromechanical failure and only delivering the desired movement of the Frame 17.

In an embodiment the apparatus derives its power from a single Battery 4. As an example, the Battery 4 could be a single AA battery, such as one manufactured by Energizer of St. Louis, Mo. as Part No. Energizer Max E91 AA Alkaline Battery or any other commercially available battery or batteries as required or desirable in light of criteria such as the specifically selected motor type employed including the motor's amperage and the voltage requirements.

A 0.7 Watt (or alternative voltage) DC motor could be used such as one manufactured by Danaher Motion of Wood Dale, Ill. as Part No. 08G. An alternative motor might be one such as a 1.5-3V DC Metal Gear Motor as manufactured by Radio Shack of Forth Worth, Tex. as their Model #: 273-258 Catalog #: 273-258. It would be apparent to anyone skilled in the art to construct the disclosed apparatus using a variety of generally available DC or other motors, tilt switches, batteries or AC power supplies, gears, wheels, wiring methods, wires and other electrical and/or mechanical components, adapting the enclosure, motor size/horse power, battery voltage/amperage, or other power supply and other components to satisfy the apparatus' intended use, so that the apparatus provides the required response to a given weight and size requirement of various available Frames.

By way of example, but in no way limiting the general spirit and scope of the potential of the various embodiments, it is anticipated that in an embodiment commercial implementations of an apparatus can be made available in a predetermined number of sizes (e.g., three sizes—small, medium, and large). With different sizes, it may be desirable to adjust the components and power of each apparatus accordingly so as to keep the device's cost and size to a minimum while providing ample power to perform acceptably within the target environment.

In an embodiment, use of the apparatus by a User can be accomplished via the following method or steps: A Frame 17, such as that depicted in FIG. 1C is first modified by attaching the Leveling Apparatus to the lower portion of the backside (i.e., the side facing to the wall or adjacent mounting surface or structure, when the picture is hung), right edge of the Frame 17. This may be accomplished using double sided adhesive tape 25 as seen in FIG. 1B, other forms of adhesive (either permanent or temporary), or with small wood screws via mounting bracket frame holes 27 as seen in FIGS. 1A and 1D or with any other method of affixing, adhering, connecting or attaching the apparatus to the Fame 17. Many other methods of affixing a device, either temporarily or permanently, are well known within the prior art.

In an embodiment, when an appropriate Battery 4 is included (and/or along with an optional power switch or other mechanism that controls power—not shown, that is turned to the on position or otherwise activated), the apparatus is enabled to operate automatically. When the Frame 17 becomes misaligned, the Tilt Switch 2 is caused to be in an "out of level" or misaligned condition as well, which, in turn causes, e.g., the Mercury 9 to come into contact with the Electrical Leads, e.g., 11 or 12 and a circuit is formed or closed. The mercury could be replaced with an electrically conducting metal ball or sphere, which would make the Tilt Switch shown in FIG. 4B more environmentally friendly without degrading performance. Many other mechanisms may be used for causing an electrical connection to be formed when the tilt switch or other sensor is in a misaligned condition or state, all of which are well known within the prior art.

If the apparatus is installed on the lower right edge of the object as described herein, and the Frame 17 is tilted down on that right side, i.e., the right side of the Frame 17 is lower than that of the left side, then the Tilt Switch 2 likewise is tilted down on that same right side and a circuit is closed within the right side of the Tilt Switch 2, which, in turn, causes electrical power from the Battery 4 to be supplied to the Motor 3. This, in turn, causes the Gear 6 to turn the Wheel 5 to turn clockwise (when facing from the right edge of the frame), which, in turn, causes the Frame 17 to "rise" on the right edge and thus the left side to "fall" i.e., lower. The movement of the Frame 17 is caused by the combination of the Wheel 5 turning and friction generated when the Wheel 5 is resting against a generally solid and generally unmovable object, such as a wall. Friction between the Wheel 5 and a wall, for example, causes the Frame 17 to move inversely to the direction of the Wheel 5. To improve friction, a Wheel 5 may be designed to enhance the friction. Such enhancement may be accomplished in numerous ways including designing the Wheel 5 similarly to those depicted in FIGS. 2C or 2D, which includes raised portions on the Wheel's surface. Moreover, the Wheel 5 may be made of a soft rubber or other pliable or semi-adhesive compound to ensure adequate friction while also ensuring that the movement of the Wheel 5 does not mar or otherwise damage the mounting surface such as a wall.

Once the Frame is returned to the level state or other desired orientation, i.e., is realigned, the Mercury 9 in the Tilt Switch 2 (or, e.g., metal ball or other conductor) returns to its neutral, i.e., "null" or centered position which causes the circuit to open, this then causes the Motor 3, Gear 6, and Wheel 5 to stop turning, while simultaneously conserving Battery 4 power for future usage.

In the case that the right edge of the Frame 17 is too high, in a similar fashion, the opposite circuit of the Tilt Switch 2, is closed, thus providing Battery 4 power to the Motor 3 but with reverse polarity (i.e., opposite the polarity used in the previous example), which, in turn, causes the Motor 3, Gear 6, and Wheel 5 to spin in the opposite (i.e., counter-clockwise) direction, which, in turn, causes the right edge of the Frame 17 to "fall" or lower. As before, as the Frame 17 returns to its original alignment, e.g., a level condition, the circuit is once again opened and the Motor 3 stops, causing the Frame 17 to stop moving as well.

The Motor 3 is coupled with an appropriate Battery 4 and Gear 6 so that the Leveling Apparatus is designed to operate and adjust the Frame 17 slowly, such that the Frame does not rise and fall (i.e., move up or down on any given edge) too quickly and/or endlessly (i.e., "swing" back and forth), but, instead, comes to rest as the Frame 17 reaches an Aligned state. In this fashion, the Frame 17 is always held in a constantly Aligned position, without any user observation or intervention.

One advantage of various embodiments is that there are no closed circuits when the Frame 17 is level or otherwise Aligned in a desired position, thereby generally reducing power consumption and potentially extending Battery 4 life. Another advantage of various embodiments is the ability to operate the apparatus without any further User observation or intervention.

Alternative designs to the present invention would be readily apparent to those skilled in the art, including designs that maintain a constant supply of current and controlling the Motor 3 or Wheel 5 via integrated circuits or other computer or electromechanical control. One advantage of this design would be to provide the User with more control of the apparatus' activation thresholds and/or sensitivity, e.g., the angle at which the device is activated or deactivated, and or to permit User selection and final placement of the device without mechanical modification, e.g., placing the device in the lower left, backside edge instead of the lower right, backside edge.

As mentioned, in an embodiment, the apparatus is placed on the lower right, backside edge of the Frame 17, however, anyone skilled in the art would find it readily apparent that the device could be easily used (with minimal or no revisions) to operate while positioned at any of the corners (or even anywhere that is slightly off center) of the Frame 17. It is generally easier for the apparatus to function (due to increased leverage) the farther the apparatus is located away from the center of gravity of the object. Additional embodiments may permit the User to change the Leveling Apparatus' orientation and/or speed of operation and/or Tilt Sensor activation point and/or sensitivity. For example, speed of Motor 3 rotation may be controlled through the use of a resistor or a variable resistor.

Depending upon the apparatus' width (e.g., given the small, medium or large version(s) and/or the type, e.g., Wheel or Surface Pressure Wheel models), an optional supporting device or Glide Button 16 as depicted in FIGS. 5C and 5D, of generally the same width as the apparatus may be affixed, e.g., on the lower left edge of the Frame 17 that is opposite the apparatus, e.g., left, so as to prevent the Frame, Work or other object from tilting inward on the edge opposite the apparatus or to be otherwise unstable against the wall.

The support device or Glide Button, or other number of Glide Buttons 16 may be made of any suitable material that will balance the Frame properly, i.e., substantially equally offsetting the width of the installed apparatus. The material may be such that it doesn't or minimally marks or otherwise mars the wall or other surfaces, for example, Nylon or Plastic. Glides such as those used on chairs may be employed or a custom Glide Button 16 may be appropriate. Alternatively, instead of a Glide Button 16, a second or other number of non-powered Glide Wheels 23 as depicted in FIGS. 5A and 5B may be constructed of similar materials to that of Wheel 5 and could be attached, e.g., to the lower left backside of the Frame 17 to provide smooth movement of the edge opposite the apparatus on the Frame 17. A Guide Wheel 23 would roll freely e.g., up or down in converse reaction to the movement of the opposite edge of the Frame 17. In the event other orientations, i.e., other than on a vertical plane, are desired, the Glide Wheel 23 would be installed in an orientation substantially similar to that of the affixed apparatus.

Figure 2B:
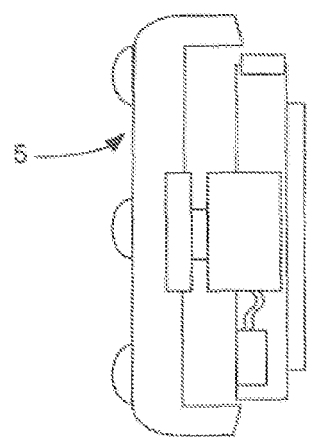
FIG. 2B is a side perspective view of an alternative embodiment of the present invention.
Figure 2C:
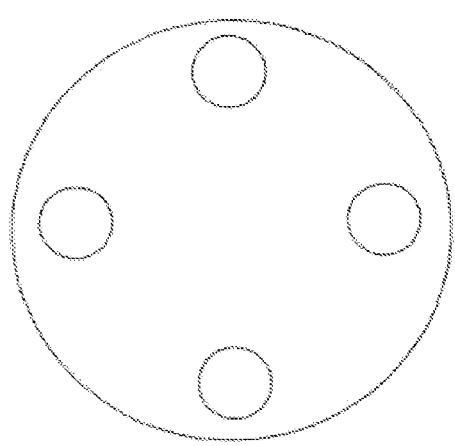
FIG. 2C is a front perspective view of a pressure wheel that may be used with the alternative embodiment of the present invention as shown in FIGS. 2A and 2B.
Figure 2D:
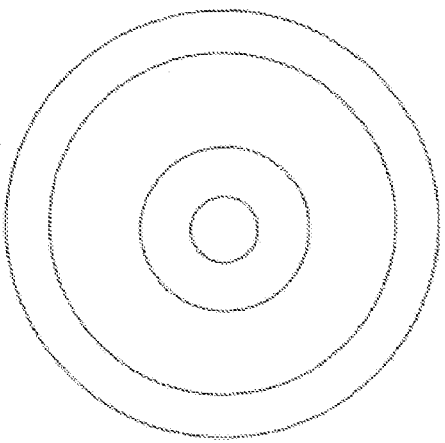
FIG. 2D is a front perspective view of a pressure wheel that may be used with the alternative embodiment of the present invention as shown in FIGS. 2A and 2B.

Referring to FIGS. 2A and 2B, an alternative to the Wheel 5's orientation is disclosed. The apparatus depicted in FIGS. 2A and 2B works in nearly an identical fashion as that of the embodiment depicted in FIGS. 1A-1D, with one major modification, i.e., to the orientation of the so-called "pressure" Wheel 5. Instead of being mounted such that the narrow portion of Wheel 5 faces and rests against (or touches) the wall as in the previously described embodiment, the flat or wide portion of the Wheel 5 faces and comes into contact with the wall as seen in FIG. 2B using wheels oriented in a flat position, relative to the wall or other mounting surface as seen in FIGS. 2C and 2D using Wheel 5. There are at least four advantages to this orientation of the Wheel 5: 1) By positioning the Wheel 5 so that a larger surface area of the Wheel 5 is in contact with the wall, greater friction may be generated, thereby transferring more of the Motor's 3 energy into vertical (or other desired directional) movement, 2) the Wheel 5 may have additional abrasive elements added to its larger surface area such as raised "nubs" or "rings" as depicted in FIGS. 2C and 2D respectively 3) this alternative position or orientation of Wheel 5 effectively reduces the overall width of the apparatus and, therefore, the distance that the Frame 17 is pushed away from the wall or other mounting surface and 4) this reduction in width also effectively changes the relative size of the optional Glide Button(s) and/or Glide Wheel(s), if used.

Referring to FIG. 4A, an optional enhancement to the apparatus may be the inclusion of a Solar Charger, which includes a Photovoltaic Cell 7 that may be positioned and affixed to the top edge of the apparatus or the top edge of the Frame 17, or anywhere ambient or other light may fall. The Photovoltaic Cell 7 may provide ample power to operate the device without the use of a Battery 4, and/or, to serve as an aid to help extend the useful life of a battery. Moreover, a Charging Regulator 8 may be included in the Solar Charger to both regulate the charging rate provided by the Photovoltaic Cell 7 and to guard against overcharging the Battery 4. Simply increasing the length of the wires attached between the Photovoltaic Cell 7 and the apparatus' enclosure 19 (FIG. 1.*a*) may accomplish remote placement of the Photovoltaic Cell 7. In this case, additional adhesive tape, mounting brackets or other hardware, e.g., a separate enclosure, may be optionally added to the Solar Charger.

Referring to FIGS. 5C and 5D, as previously mentioned, the Leveling Apparatus' width may be countered with the attachment of a slide or Glide Button 16 or, alternatively as seen in FIG. 5A and 5B a Glide Wheel 23. Affixing either device to the Frame 17 in the bottom backside corner, opposite the Leveling Apparatus, e.g., as depicted in FIG. 5C, the Frame 17 will remain equidistant from the wall at both corners of Frame 17 in an esthetically pleasing position. An additional benefit of this arrangement is that the Frame 17 may be more equally distant from the wall at all four corners. Finally, adding a Glide Button(s) and/or Glide Wheel(s) may reduce friction between the wall and the corner of the Frame 17 opposite the Leveling Apparatus, which, in turn, will reduce power requirements, consumption and wear and tear on the Motor 3.

The Glide Button 16 may be affixed to the Frame 17 using adhesive double sided tape 26 as shown in FIGS. 5C and 5D or a Glide Pin (or nail or tack) may be used (not shown), or, absent double sided tape or a pin, it may be affixed using commercially available temporary or permanent adhesives. Glide Button 16 may be made of a plastic resin, nylon or other semi-pliable or ridged material commonly used with so-called chair glides such as the chair glides manufactured by International Equipment Components of Signal Hill, Calif. e.g., their Light Duty, Nylon Base (round tubing), with nail (i.e. pin) chair glide, as their Part No. IL22-R1.

The Glide Wheel 23 may be constructed similarly to the pressure Wheel 5 and may be of the same or smaller size than Wheel 5; however it should be constructed in combination with the Glide Wheel Bracket 24 and Glide Wheel Adhesive Tape 25 such that, in combination, the entire assembly maintains the Frame 17 at a distance generally equal to the overall width of the Leveling Apparatus. Glide Wheel 23 may be affixed to Frame 17 using Glide Wheel Adhesive 25, which may be double sided adhesive tape, or absent Glide Wheel Adhesive, via a bracket mounting holes and screws or nails, using any commercially available wood screw or other screw or nail of an approximate length, which is less than or substantially less than the depth of the Frame 17 but still of an appropriate length to ensure that the Glide Wheel 23 remains firmly affixed to Glide Wheel 23 and Frame 17.

Instead of a DC Motor, various other means for rotating a wheel, gear or other components may be substituted for the DC motor. For example, an AC Motor may be directly attached to a turning wheel with power supplied via a common household electrical plug and power converter or transformer.

Also, instead of a Wheel 5, other components may be employed to selectively move a portion of an object (e.g., a corner of a frame) in a manner that aligns the object (e.g., moves the corner up or down). For example, a ball of an appropriate diameter or a cylinder of an appropriate diameter and length could replace the Wheel 5.

The principles and apparatus described herein may be readily employed to maintain an object's alignment with other planes besides the horizontal plane. For example, embodiments of the invention can be readily employed to achieve alignment with any arbitrary angle (e.g., a plane that forms an angle of five degrees or 90 degrees with the horizontal plane). It would be readily apparent to anyone with ordinary skill in the art that the tilt switch may be manually aligned (or in some cases, electronically or programmatically adjusted or aligned) in any desirable orientation or axis, including multiple orientations or axes. Consequently, the apparatus may be designed or used to maintain any desirable alignment as compared with any fixed point in space.

It will be readily apparent to anyone with ordinary skill in the art as to the electrical components, wiring and other modifications necessary to add an audible notification device such as a beeper or buzzer and/or a visual notification such as a steady or flashing light to the apparatus. The addition of a buzzer, beeper or other audible and/or visual notification device(s) may add a pleasing effect to the overall operation of the apparatus such that the User may be made aware of the apparatus' operation and may observe or point out to other bystanders the apparatus as it automatically aligns the object or frame. Such optional notification device(s) would typically not be an ongoing nuisance as the apparatus would generally be in a stable or aligned position; therefore, the notification device(s) would generally only be activated when the apparatus is in actual operation.

Additional benefits of notification device(s) are: 1) in the event a person or other outside force, such as the wind, moves or otherwise disturbs the alignment of a Frame or other object, a sound and/or light will be generated, which might prove useful in a personal residence or in an art gallery or museum, 2) such notification device(s) may serve as a warning or alarm to deter unauthorized persons from disturbing valuable items, and 3) should one or more components in the apparatus fail, which causes the device to swing or otherwise fail to achieve the desired alignment, the notification device may alert the User to such a failure of the apparatus. A buzzer could be used such as one manufactured by Radio Shack of Fort Worth, Tex. as their Model #: 273-054, Catalog #: 273-054. A light could be used such as a Light Emitting Diode such as one manufactured by Radio Shack of Fort Worth, Tex. as their Catalog #: 276-350.

It will thus be apparent that there has been provided in accordance with the present invention a Leveling Apparatus with an integrated Tilt Switch and, ideally, a Dual Throw, Dual Pole Tilt Switch, which achieves the aims and advantages specified herein.

Additional Embodiments

Additional non-limiting embodiments are provided in the following enumerated paragraphs.

1. A Leveling Apparatus, comprising:
   a. An Enclosure
   b. A Tilt Switch operably connected to the enclosure
   c. A Battery in electrical communication with the tilt switch
   d. A Direct Current (DC) Motor in electrical communication with the battery; and
   e. A Wheel attached to the Motor via a Gear
2. A Leveling Apparatus as defined in Embodiment 1, capable of automatically adjusting a Frame through the use of a pressure wheel placed vertically or horizontally against any fixed object and controlled thereby.
3. A Leveling Apparatus as defined in Embodiment 1, further comprising a Glide Button that maintains a Frame equidistant from a wall or other mounting surface.
4. A Leveling Apparatus as defined in Embodiment 1, further comprising and includes a Glide Wheel Mounting Bracket.
5. A Leveling Apparatus as defined in Embodiment 3, further comprising a Glide Pin.
6. A Leveling Apparatus as defined in Embodiment 1, further comprised of a Photovoltaic Cell or Array attached to the Leveling Apparatus' enclosure.
7. A Leveling Apparatus as defined in Embodiment 1, further comprised of a Photovoltaic Cell or Array providing sufficient excess wiring to affix the Photovoltaic Cell or Array to a point distant from the Leveling Apparatus enclosure, including the top or side of a Frame or to an adjacent wall or other fixture or object.
8. A Leveling Apparatus as defined in Embodiment 1, further comprised of a Photovoltaic Cell or Array and a Charging Regulator, which extends the useful life of the battery in the Leveling Apparatus and, furthermore, prevents overcharging the battery.

9. A Leveling Apparatus as defined in Embodiment 1, further comprised of a buzzer or beeper to alert the User that the Leveling Apparatus is in operation.

10. A Leveling Apparatus as defined in Embodiment 1, with an integral tilt switch capable of user manual adjustable threshold and sensitivity settings.

11. A Leveling Apparatus as defined in Embodiment 1, with an integral tilt switch capable of user software adjustable threshold and sensitivity settings.

12. A tilt switch capable of controlling two, or more, circuits given one angle of declination, comprised of two, or more, sets of electrical leads.

13. A wiring method connected to a Battery, Tilt Switch and Motor such that the Motor may only receive electrical power with a given specific polarity as controlled by a Tilt Switch capable of controlling the state of an electrical circuit according to the angle of inclination of the switch.

14. A wiring method as defined in Embodiment 13, further comprised of Photovoltaic Cell or Array to provide additional charging power when exposed to ambient light.

15. A wiring method as defined in Embodiment 13, further comprised of a Charging Regulator that prevents overcharging of the Battery.

16. A wiring method as defined in Embodiment 13, further comprised of a Resistor that regulates the speed of the Motor.

It will, of course, be understood that the foregoing description is of exemplary embodiments of the invention and that the invention is not limited to the specific embodiments shown. Various changes and modifications will become apparent to those skilled in the art and all such variations and modifications are intended to come within the spirit and scope of the appended claims.

What is claimed is:

1. An apparatus comprising:
   a component for attaching to an object;
   a tilt switch that is operable to determine if an axis of the object is misaligned with a desired axis;
   a second device that orients the object based on the determining of the tilt switch;
   and a power source in electrical communication with the tilt switch;
   wherein the second device comprises a wheel that is in electrical communication with the power source.

2. The apparatus of claim 1 wherein the tilt switch comprises a housing with a cylindrical cavity containing a mobile, electrically conductive material.

3. The apparatus of claim 1 wherein when the tilt switch determines that an axis of the object is misaligned with the axis of gravity, a circuit is completed between the tilt switch, the power source, and the wheel, such that the wheel is rotated so as to return the object to proper alignment.

* * * * *